United States Patent
Andreasen et al.

(10) Patent No.: US 12,387,538 B2
(45) Date of Patent: Aug. 12, 2025

(54) SYSTEM AND METHOD FOR DETERMINING VEHICLE HEALTH

(71) Applicant: Innova Electronics Corporation, Irvine, CA (US)

(72) Inventors: Keith Andreasen, Garden Grove, CA (US); Phuong Pham, Fountain Valley, CA (US); Thuan Cong Huynh, Ho Chi Minh (VN)

(73) Assignee: Innova Electronics Corporation, Irvine, CA (US)

( * ) Notice: Subject to any disclaimer, the term of this patent is extended or adjusted under 35 U.S.C. 154(b) by 418 days.

(21) Appl. No.: 17/580,442

(22) Filed: Jan. 20, 2022

(65) Prior Publication Data

US 2023/0230430 A1 Jul. 20, 2023

(51) Int. Cl.
| | | |
|---|---|---|
| *G07C 5/08* | (2006.01) | |
| *G07C 5/04* | (2006.01) | |
| *B60S 5/00* | (2006.01) | |

(52) U.S. Cl.
CPC ............ *G07C 5/0825* (2013.01); *G07C 5/04* (2013.01); *G07C 5/0808* (2013.01); *G07C 5/085* (2013.01); *B60S 5/00* (2013.01)

(58) Field of Classification Search
CPC ...... G07C 5/0825; G07C 5/04; G07C 5/0808; G07C 5/085; G07C 5/008; B60S 5/00
See application file for complete search history.

(56) References Cited

U.S. PATENT DOCUMENTS

| | | |
|---|---|---|
| 6,807,469 B2 | 10/2004 | Funkhouser et al. |
| 6,925,368 B2 | 8/2005 | Funkhouser et al. |
| 7,620,484 B1 | 11/2009 | Chen |
| 8,019,503 B2 | 9/2011 | Andreasen et al. |
| 8,370,018 B2 | 2/2013 | Andreasen et al. |
| 8,909,416 B2 | 12/2014 | Chen et al. |
| 9,026,400 B2 | 5/2015 | Chen et al. |
| 9,177,428 B2 | 11/2015 | Nguyen et al. |
| 9,646,432 B2 | 5/2017 | Madison et al. |
| 10,643,403 B2 | 5/2020 | Madison et al. |
| 2011/0279283 A1* | 11/2011 | Corn .................. G06Q 10/08 340/686.6 |
| 2013/0297143 A1 | 11/2013 | Chen et al. |
| 2014/0040434 A1* | 2/2014 | Rybak ................. G07C 5/085 709/219 |

(Continued)

*Primary Examiner* — Yuen Wong
(74) *Attorney, Agent, or Firm* — Stetina Garred Brucker & Newboles

(57) ABSTRACT

A method of determining a vehicle health score for a vehicle includes receiving location information associated with a location of the vehicle and identifying at least one location-specific health factor based on the received location information. The method further includes receiving diagnostic data from the vehicle, with the diagnostic data including data points associated with several different heath factors including the at least one location-specific health factor, each health factor being associated with an acceptable condition. The received diagnostic data is compared with the acceptable conditions for each health factor and a preliminary score for each health factor is assigned based on the comparison. A weight is assigned to each of the preliminary scores and a comprehensive vehicle health score is calculated based on each of the weighted preliminary scores. The comprehensive vehicle health score is then displayed on a display.

22 Claims, 6 Drawing Sheets

(56) References Cited

U.S. PATENT DOCUMENTS

| | | | |
|---|---|---|---|
| 2015/0105969 A1* | 4/2015 | Dudar | F02M 25/0809 |
| | | | 701/32.4 |
| 2016/0171802 A1* | 6/2016 | Fountain | G07C 5/08 |
| | | | 701/31.4 |
| 2017/0116793 A1* | 4/2017 | Lin | G07C 5/085 |
| 2019/0304208 A1 | 10/2019 | Chen et al. | |
| 2019/0304213 A1 | 10/2019 | Chen et al. | |
| 2020/0117565 A1* | 4/2020 | Ponnuvel | G06F 11/2284 |
| 2021/0264384 A1* | 8/2021 | Chau | G06K 7/1413 |

\* cited by examiner

SYSTEM AND METHOD FOR DETERMINING VEHICLE HEALTH

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to automotive diagnostics and more specifically to an automotive diagnostic system and related methodology for calculating a vehicle health score and displaying the vehicle health score on a vehicle health gauge.

2. Description of the Related Art

Modern vehicles include a number of different onboard sensors and monitors that observe various operational parameters of the vehicle during use of the vehicle. Vehicles built after 1996 have an OBD-II (On-board diagnostics II) system, which refers to a standard that specifies the type of diagnostic connector port on the vehicle, as well as the electrical signaling protocols used on the vehicle. The OBD-II system may run diagnostic programs on the vehicle to detect degraded or failed emission-related components or systems that may cause a significant increase in emissions. This monitoring may include a set of computer-managed diagnostic programs, commonly referred to as monitors or readiness monitors, that verify correct operation of emission-related components or systems within the manufacturers' specifications. Many states in the US have regulations for readiness monitors, with the regulations being based on year, make, model, the type of engine, and/or the type of fuel, e.g., gasoline or diesel. Depending on the vehicle specifics, a vehicle may fail a smog check or vehicle emission inspection because one or more incomplete readiness monitors are present. In this regard, the conventional smog check or vehicle emission inspections are typically binary i.e., pass or fail, and thus, do not provide a more nuanced assessment as to the health of the emissions system(s) on the vehicle.

The OBD-II system may be capable of outputting information to allow a user to assess the health of the vehicle. This information may include diagnostic trouble codes (DTCs), the malfunction indictor lamp (MIL) status, and the readiness monitor status.

Permanent Diagnostic Trouble Codes (PDTC) are like regular DTCs; however, unlike regular DTCs, these PDTCs typically cannot be reset by disconnecting the vehicle's battery or be cleared using an OBD scan tool. In most instances, the only way to clear a PDTC is to fix the underlying problem with the vehicle that originally caused the PDTC and any corresponding DTC to activate, and then allow the vehicle sufficient drive time to re-run the monitor that identified the problem in the first place. When the monitor runs without identifying a problem, the PDTC will likely clear itself. Some states have started OBD inspection for PDTCs in their respective smog check programs.

Vehicles that have a PDTC stored in the OBD system may fail the smog check inspection, regardless of whether the MIL is illuminated. If a PDTC is stored, it indicates that the OBD system has not yet successfully verified that a previously detected emissions-related malfunction is no longer active.

Therefore, there is a need in the art for more detailed information related to vehicle health, and more specifically, vehicle health after a PDTC has been triggered and a repair has been made. Various aspects of the present disclosure address this particular need, as will be discussed in more detail below.

BRIEF SUMMARY

According to one embodiment, there is provided a method of determining a vehicle health score for a vehicle. The method includes receiving location information associated with a location of the vehicle and identifying at least one location-specific health factor based on the received location information. The method further includes receiving diagnostic data from the vehicle, with the diagnostic data including data points associated with several different heath factors including the at least one location-specific health factor, each health factor being associated with an acceptable condition. The received diagnostic data is compared with the acceptable conditions for each health factor and a preliminary score for each health factor is assigned based on the comparison. A weight is assigned to each of the preliminary scores and a comprehensive vehicle health score is calculated based on each of the weighted preliminary scores. The comprehensive vehicle health score is then displayed on a display.

At least one of the health factors impacting the comprehensive vehicle health score negatively may be identified. A replacement part associated with the at least one of the health factors impacting the comprehensive vehicle health score negatively may also be identified. A repair procedure associated with the at least one of the health factors impacting the comprehensive vehicle health score negatively may additionally be identified.

The identified location-specific health factor may relate to a local smog regulation. The identified location information may be received from a GPS circuit located in a handheld electronic device, or from an entry made by a user.

The diagnostic data may include DTC data, readiness monitor status data, and MIL status data.

The DTC data may include information regarding whether a DTC has been stored, is pending, or is absent. The DTC data may also include information regarding engine run time since DTC has cleared, the number of warm-up since DTC has cleared, and the distance traveled since DTC has cleared.

The MIL status data may include MIL status, distance traveled while MIL is activated, and engine run time while MIL is activated.

According to another embodiment, there is provided a system for determining a vehicle health score for a vehicle. The system includes a data acquisition tool operatively connectable to a vehicle for retrieving diagnostic data therefrom. The system additionally includes a memory circuit having acceptable conditions associated with a plurality of vehicle health factors stored thereon and weights assigned to each of the vehicle health factors. A scoring circuit is in communication with the memory circuit and the data acquisition tool, with the scoring circuit being configured to compare the received diagnostic data with the acceptable conditions for each health factor and assigning a preliminary score for each health factor based on the comparison.

The system may include a diagnostic computing device separate from the data acquisition tool, with the memory circuit being located in the diagnostic computing device. The scoring circuit may be located in the diagnostic computing device. The diagnostic computing device may be a diagnostic server.

The scoring circuit may be located outside of the diagnostic computing device.

The scoring circuit may be configured to identify at least one of the health factors impacting the comprehensive vehicle health score negatively. The scoring circuit may be configured to identify a replacement part associated with the at least one of the health factors impacting the comprehensive vehicle health score negatively. The scoring circuit may also be configured to identify a repair procedure associated with the at least one of the health factors impacting the comprehensive vehicle health score negatively.

According to another embodiment, there is provided a non-transitory computer readable medium storing computer executable instructions for use in determining a vehicle health score for a vehicle. The computer executable instructions are downloadable onto a mobile communication device for configuring the mobile communication device to: determine location information associated with a location of the vehicle; identify at least one location-specific health factor based on the determined location information; receive diagnostic data from the vehicle, the diagnostic data including data points associated with several different heath factors including the at least one location-specific health factor, each health factor being associated with an acceptable condition; compare the received diagnostic data with the acceptable conditions for each health factor and assigning a preliminary score for each health factor based on the comparison; assign a weight to each of the preliminary scores; calculate a comprehensive vehicle health score based on each of the weighted preliminary scores; and display the comprehensive vehicle health score on a display.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a vehicle health determination and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
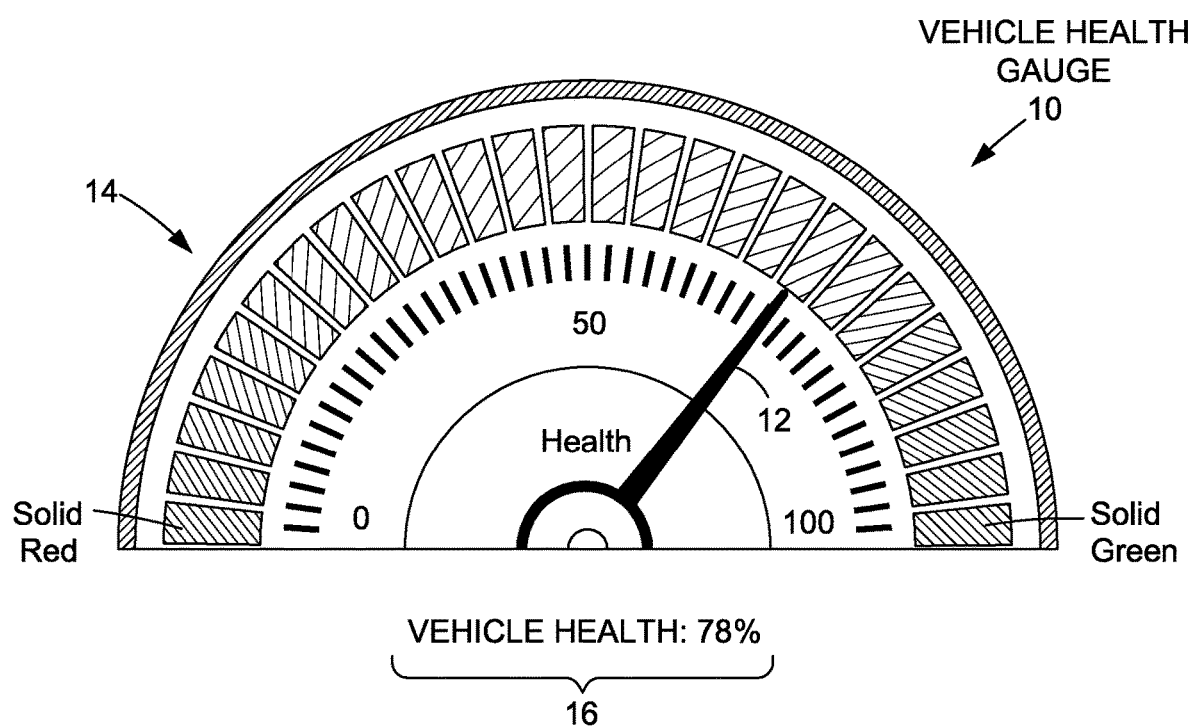
FIG. 1 is an exemplary vehicle health gauge and underlying vehicle data resulting in the depicted vehicle health score of 78%.

Various aspects of the present disclosure are directed toward assessing several data points retrieved from the vehicle and comparing the retrieved data to preset standards to determine a vehicle health score. The vehicle health score may be particularly useful to determine whether a previously performed fix is resulting in better health of the vehicle, or if the fix is having a negligible impact on health, or possibly, a negative impact on health. That vehicle health score may be presented as a digital gauge, e.g., a vehicle health gauge, to quickly and easily illustrate vehicle health to a user. An exemplary vehicle health gauge 10 is depicted in FIG. 1, and includes an indicator needle 12 which may be positioned over a scale 14 ranging from 0% (most unhealthy score) to 100% (healthiest score). The scale 14 may also be associated with a range of color. For instance, the color red may be indicative of a 0% score, with the color transitioning from red toward yellow, with yellow being indicative of a 50% score, and then the color further transitioning from yellow to green, with green being indicative of a 100% score. The scale 14 may include a series of scale lines which break up the scale 14 in even segments to facilitate reading of the score relative to the position of the indicator needle 12. The digital gauge 10 may also include a field or region 16 which depicts the calculated health score in numerical form (e.g., 78%). As such, by presenting the score in both the colorized scale, as well as in numerical form, the user may quickly and easily identify the score, as well as identify the relative health position based on the position of the needle 12 on the color gradient on the scale 14.

Figure 2:
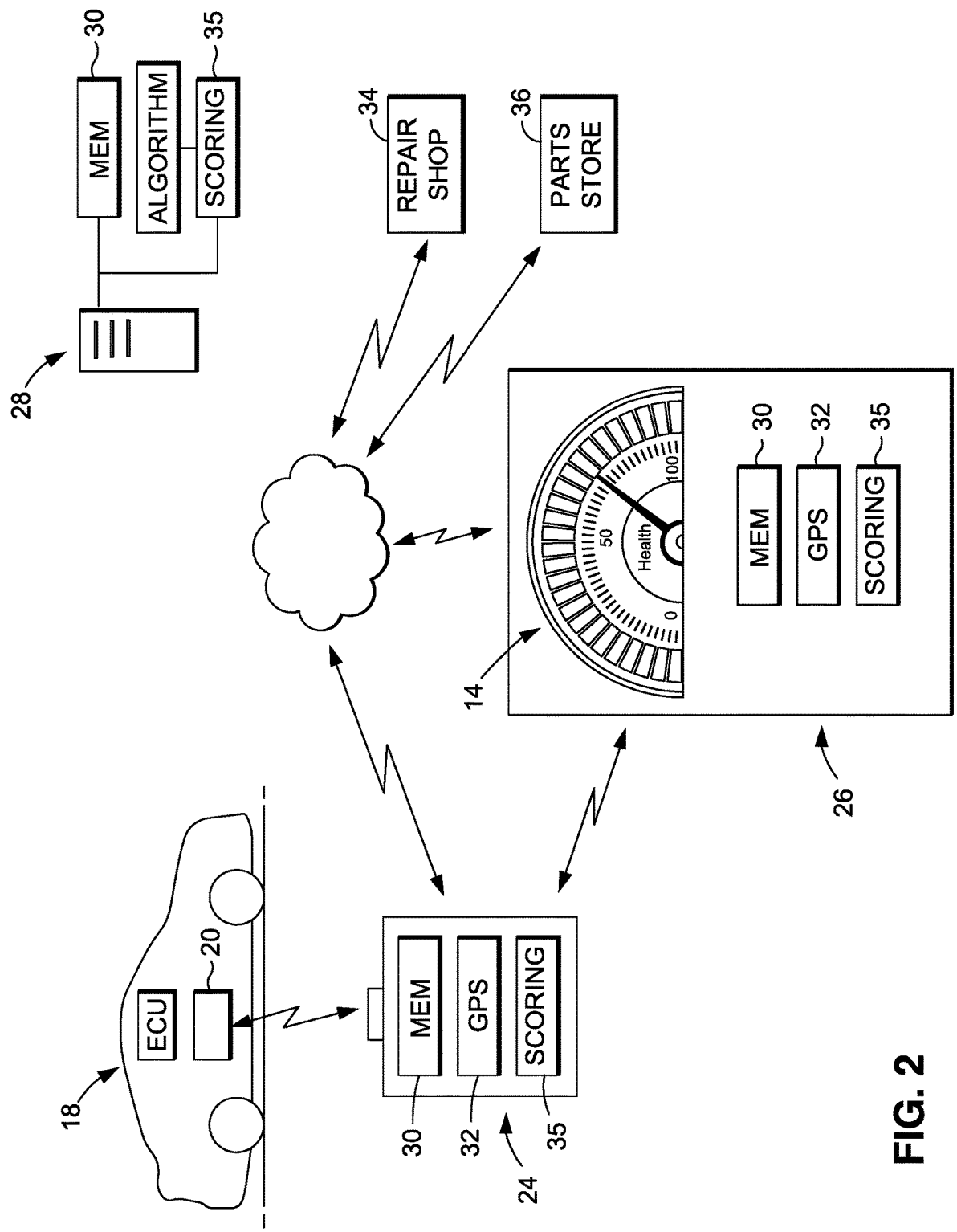
FIG. 2 is an exemplary embodiment of a schematic diagram of vehicle health gauge system.

Referring now to FIG. 2, there is depicted a vehicle 18 having an onboard diagnostic system including a diagnostic port 20 in communication with various electrical components on the vehicle 18. The electrical components may include one or more electronic control units (ECUs), sensors, gauges, etc., that may provide operational data associated with operation of the vehicle 18. In this regard, if during the course of operating the vehicle 18, a fault occurs, diagnostic data indicative of that fault (e.g., a DTC or PDTC) may be generated and accessed through the diagnostic port 20 on the vehicle 18. The onboard diagnostic system may additionally be configured to perform tests (e.g., readiness monitors) to identify possible diagnostic issues with the vehicle 18, and in particular, diagnostic issues associated with the emissions systems.

FIG. 2 illustrates a vehicle health gauge system 22 usable with the vehicle 18. The vehicle health gauge 22 system depicted in FIG. 2 generally includes a data acquisition tool 24, a smartphone 26, and a remote server 28. The data acquisition tool 24 may be a diagnostic dongle, a code reader, a scan tool, or any other diagnostic hardware known in the art that is configured to interface with the diagnostic port 20 on the vehicle 18 for retrieving data generated by the vehicle 18. The data acquisition tool 24 may be placed in communication with the diagnostic port 20 via plug connection, or alternatively, it is contemplated that wireless communication between the diagnostic port 20 (or related data transmitter) and the data acquisition tool 24 may also be used to facilitate data transfer between the diagnostic port 20 and the data acquisition tool 24. The data retrieved from the vehicle, e.g., diagnostic data, may include data points associated with several different heath factors including the at least one location-specific health factor (e.g., smog related data). As will be explained in more detail below, the data retrieved from the vehicle 18 may include, but is not limited to, a vehicle identification number (VIN), fuel type of the engine, DTCs, readiness monitor status data, malfunction indicator lamp (MIL) status data, vehicle distance traveled while MIL is activated, engine run time while MIL is activated, engine run time since DTCs have been cleared, number of warm-ups since DTCs have been cleared, distance traveled since DTCs have been cleared, and PDTCs. As noted above, a PDTC, i.e., Permanent Diagnostic Trouble Code, is like a regular DTC; however, unlike regular DTCs, PDTCs typically cannot be reset by disconnecting the vehicle's battery or be cleared using an OBD scan tool. In most instances, the only way to clear a PDTC is to fix the underlying problem with the vehicle that originally caused the PDTC and any corresponding DTC to activate, and then allow the vehicle sufficient drive time to re-run the monitor that identified the problem in the first place. When the monitor runs without identifying a problem, the PDTC will likely clear itself.

The vehicle health gauge system 22 may rely on one or more resources external to the data acquisition tool 24, such as the smartphone 26, a tablet computer, other handheld electronic device, a personal computer, etc. (collectively referred to herein as the smartphone), as well as the remote server 28 capable of processing data to achieve a vehicle health gauge score and facilitate implementation of various functionalities associated with the determination of the vehicle health gauge score.

The vehicle health gauge system 22 may additionally include a memory circuit 30 capable of at least temporarily storing data retrieved from the vehicle 18. The memory circuit 30 may also include one or more algorithms, computer executable instructions, and/or related predetermined standards stored thereon to effectuate the vehicle health score determination described herein. The memory circuit 30 may be located in the data acquisition tool 24, the smartphone 26, and/or the remote server 28. It is contemplated that the memory circuit 30 refers broadly to the hardware necessary to facilitate storage of the data retrieved from the vehicle 18, as well as the algorithms, etc., used to complete the health assessment. The hardware may include flash memory, random-access memory (RAM), or other memory hardware known in the art. As such, the memory circuit 30 may be located in more than one component, e.g., one portion of the memory circuit 30 may be located on the data acquisition tool 24, while another portion of the memory circuit 30 may be located on the remote server 28, and still another portion of the memory circuit 30 may be located on a user's smartphone 26. The data, algorithms, or instructions stored on the different memory circuit portions may cooperate with each other to implement the vehicle health score determination and related functionalities disclosed herein.

Each health factor used in the determination of the vehicle health gauge score may be associated with an acceptable condition that may be predefined by an operator of the vehicle health gauge system 22. For instance, with regard to DTCs, an acceptable condition would be no pending DTCs. Thus, if the retrieved data shows no DTCs, the condition would be met. On the other hand if the retrieved data showed one or more DTCs, the condition would not be met. Another factor may be Distance Traveled While MIL is Activated. The acceptable condition may be defined as a range between 0 miles and 200 miles. If the retrieved data shows 0 miles traveled while the MIL is activated, the condition would be met with 100% acceptance. If the retrieved data shows 200 or more miles traveled while the MIL is active, the condition would not be met (e.g., 0% acceptance). If the retrieved data shows a value between 0-200 miles traveled while the MIL is active, the condition would be partially met. For instance, a distance of 100 miles traveled would be indicative of the condition being 50% met; 50 miles traveled would be indicative of the condition being 75% met; 150 miles traveled would be indicative of the condition being 25% met, and so forth.

The system 22 may include a scoring circuit 35 in communication with the memory circuit 30 and the data acquisition tool 24 to compare the received diagnostic data with the acceptable conditions for each health factor and assign a preliminary score for each health factor based on the comparison. The preliminary scores for the health factors may be added based on a weighted scoring system to compute the final vehicle health score, as will be described in more detail below. The scoring circuit 35 may include the hardware and software necessary to facilitate comparison of the retrieved data with the acceptable conditions to calculate the preliminary scores, as well as to compile the preliminary scores based on assigned weights to determine the final vehicle health grade. Thus, the scoring circuit 35 may include one or more processors, as well as algorithms or computer executable instructions that may be implemented by the processor(s). The scoring circuit 35 may be located in the data acquisition tool 24, the smartphone 26, and/or the remote server 28.

Figures 3, 3A, 3B:
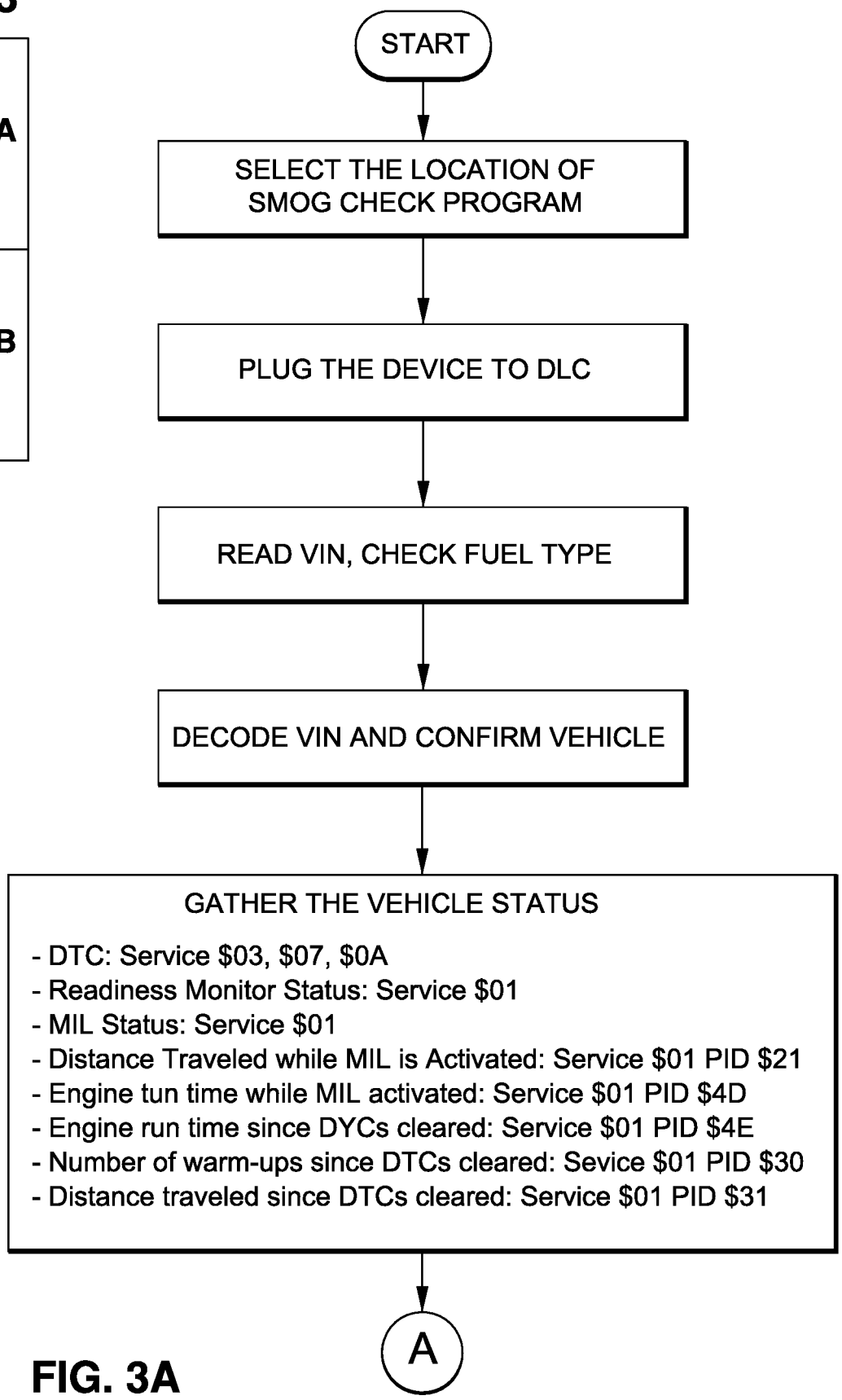
FIGS. 3A-3B combine to depict a flow chart of an exemplary methodology associated with determining a vehicle health score.
Figure 3B:
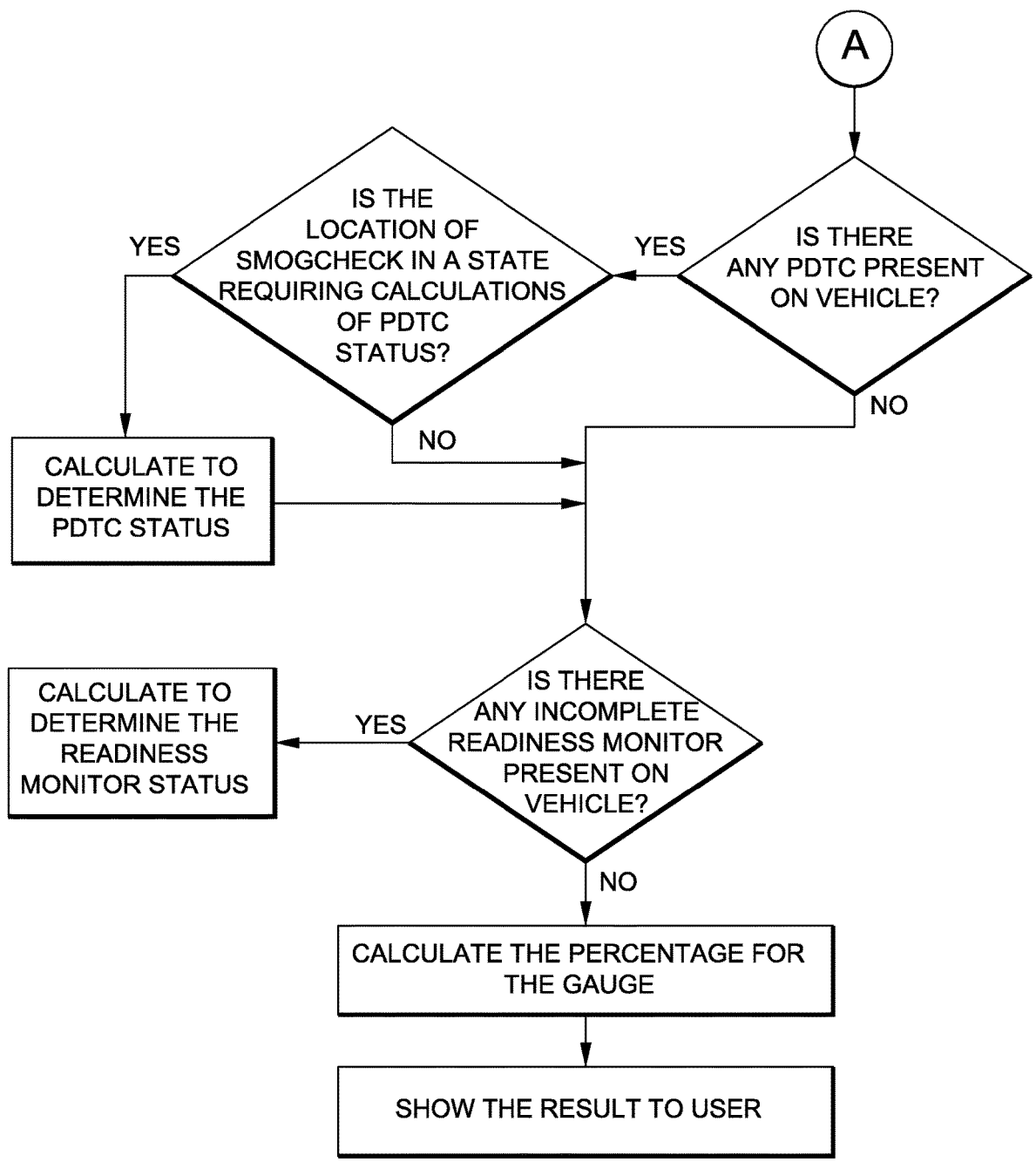
Figure 4A:
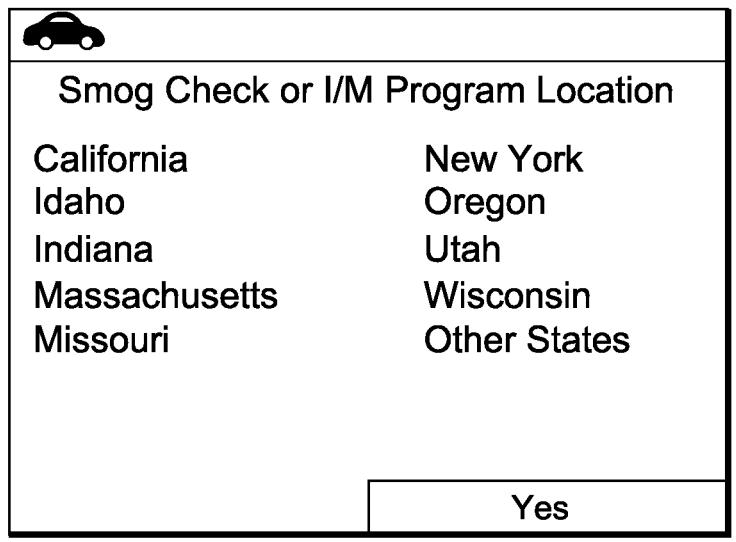
FIGS. 4A-4E are exemplary screenshots that may be depicted on an electronic device as a user proceeds through the methodology of FIGS. 3A-3B.

According to one embodiment, and referring now to FIGS. 3A-3B, an initial step in the vehicle health score determination process may entail determining the user's location. FIG. 4A-4E show various screenshots that may be depicted on display screen as a user proceeds through the method. Local vehicle operations standards may be used in the vehicle health score analysis, and thus, once the user's location is determined, the applicable local standards associated with that location may be identified. For instance, smog regulations may vary from state-to-state, and thus, identifying the applicable regulation may be useful in providing the most accurate assessment as to the vehicle's health. If the data acquisition tool 24 includes a user interface, the location may be entered by the user directly into the data acquisition tool 24. Alternatively, the location may be entered via the user's smartphone 26 via an application ("app.") downloadable and executable on the smartphone 26. FIG. 4A shows an exemplary screen which lists several states that may be selected by a user to enter the user's location. It is also contemplated that the data acquisition tool 24 and/or the smartphone 26 may be configured to automatically detect the location via a GPS circuit, WiFi network, or other forms of geolocation known in the art.

Figure 4B:
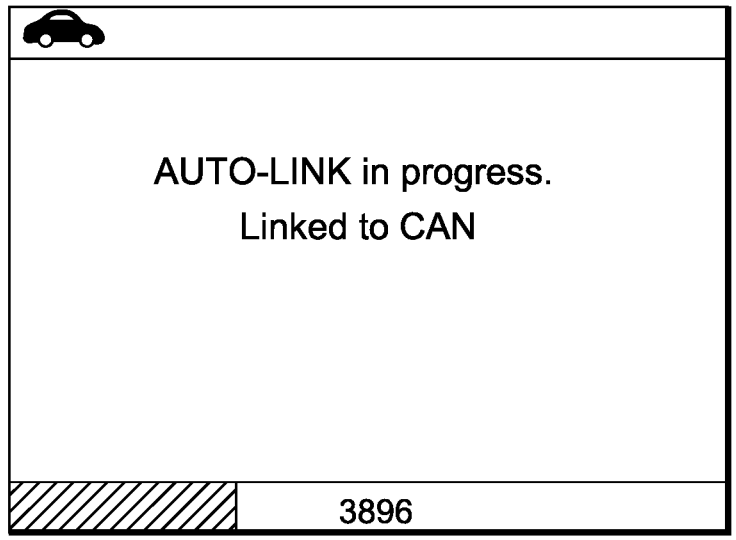
Figure 4C:
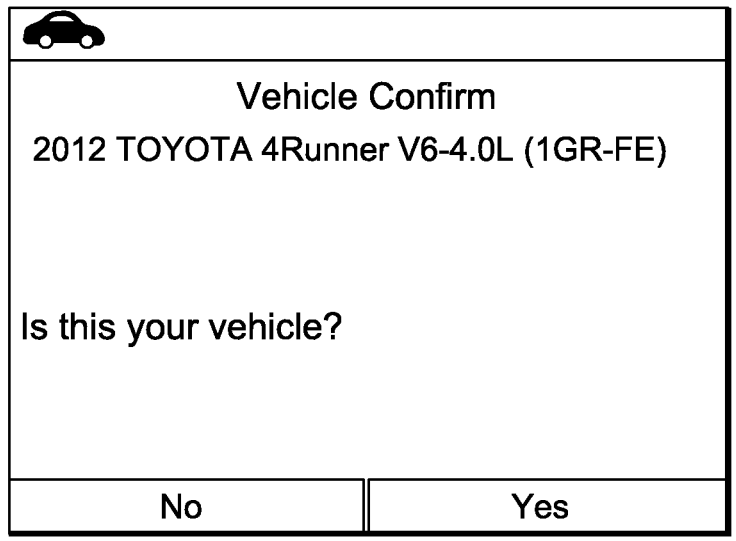

A user will plug the data acquisition tool 24 into the diagnostic port 20 (e.g., data link connector "DLC") on the vehicle 18 to establish communication with the vehicle 18. FIG. 4B may be representative of a display screen depicted on an electronic device while a communication link is being established between the data acquisition tool 24 and the vehicle. Once a communication link is established, the data acquisition tool 24 will generate and transmit a request for the VIN from the vehicle 18. Upon receiving the request, the vehicle 18 will communicate the VIN to the data acquisition tool 24. As an alternative, the VIN may be acquired by scanning a barcode, QR code, or other indicia on the vehicle 18 associated with the VIN, or by having the user manually enter the VIN into the data acquisition tool 24 or the smartphone 26. Once the VIN is acquired, the VIN may be decoded to determine the year, make, model and engine particulars of the vehicle 18, which may be used to identify various communication protocols that may be needed to facilitate further requests or communications with the vehicle 18. Furthermore, identification of the year, make, model, and engine may also be used by the diagnostic system to identify certain vehicle-specific thresholds that may be used in determining vehicle health, as will be described in more detail below. FIG. 4C may be representative of a screenshot, depicted on a display screen, of vehicle information derived from the VIN.

With the various communication protocols being identified based on the VIN, the data acquisition tool 24 may request certain data points, data sets, and/or data packets from the vehicle 18. In particular, the data acquisition tool 24 may request the fuel type of the engine. This particular request may be made use service $01 PID 01, service $01 PID 51, or the user can input the fuel type of the engine manually. In smog check inspections, there may be different regulations for diesel and gasoline vehicles in the quantity of the incomplete monitors and the monitor type that is accepted. Furthermore, the analysis of diesel and gasoline vehicles may vary from state to state.

The data acquisition tool 24 may also request a packet or set of diagnostic data associated with the vehicle health factors used in calculating the vehicle health score. These data points may include triggered DTC(s), Readiness Monitor status, MIL status, the value of distance traveled while MIL is activated, the value of engine run time while MIL is activated, the value of engine run time since DTCs have been cleared, the value of number of warm-ups since DTCs have been cleared, and the value of distance traveled since DTCs have cleared. Other data or information may also be retrieved from the vehicle without departing from the spirit and scope of the present disclosure. Any data retrieved from the vehicle may be stored, at least on a temporary basis, on the memory circuit, as described above.

The vehicle health gauge system 22 may additionally be configured to detect a PDTC status. The PDTC status may refer to whether a PDTC has been triggered or whether a PDTC has not been triggered. In the event a PDTC has not been triggered, the vehicle health gauge system may assign a health value of 100%.

However, if a PDTC has been triggered, the vehicle health gauge system 22 may proceed to evaluate retrieved PID criteria values, which may include the number of warm-ups since DTCs have cleared and the distance traveled since DTCs have cleared. These retrieved PID criteria values may be compared with predetermined values to determine whether the retrieved PID criteria values fall within an acceptable range. If the retrieved PID criteria values fall within the acceptable range, a conclusion may be made that the vehicle health is improved, and thus, the vehicle health gauge system 22 may assign an improving health grade, e.g., an increased percentage. If vehicle health is improving, it may be assumed that continued operation of the vehicle 18 may result in the PDTC requirements being met, which may clear the PDTC. Subsequent retrieval of data from the vehicle 18 may confirm clearing of the PDTC. However, if the PDTC remains present after continued operation, that may be an indication that the PDTC requirements have not yet been met.

Figure 4D:
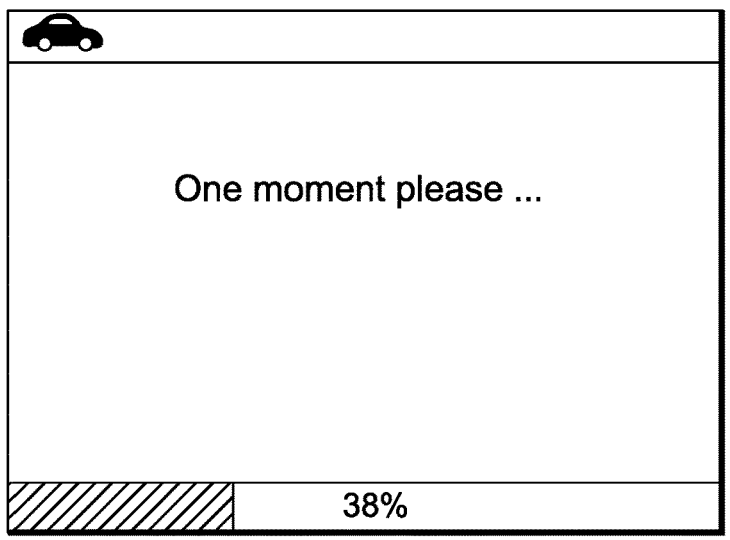

Based on location, engine type, and vehicle year, the state regulation may be used to determine which monitor(s) and how many incomplete monitor(s) may be allowed. The vehicle health gauge system may detect if a readiness monitor factor is accepted or not. An accepted readiness monitor status may be an indication that the readiness monitor is completed. An unaccepted readiness monitor status may be an indication that the readiness monitor is incomplete. FIG. 4D may be an exemplary representation of a screenshot depicted on an electronic device while data from the vehicle is being retrieved.

Figure 4E:
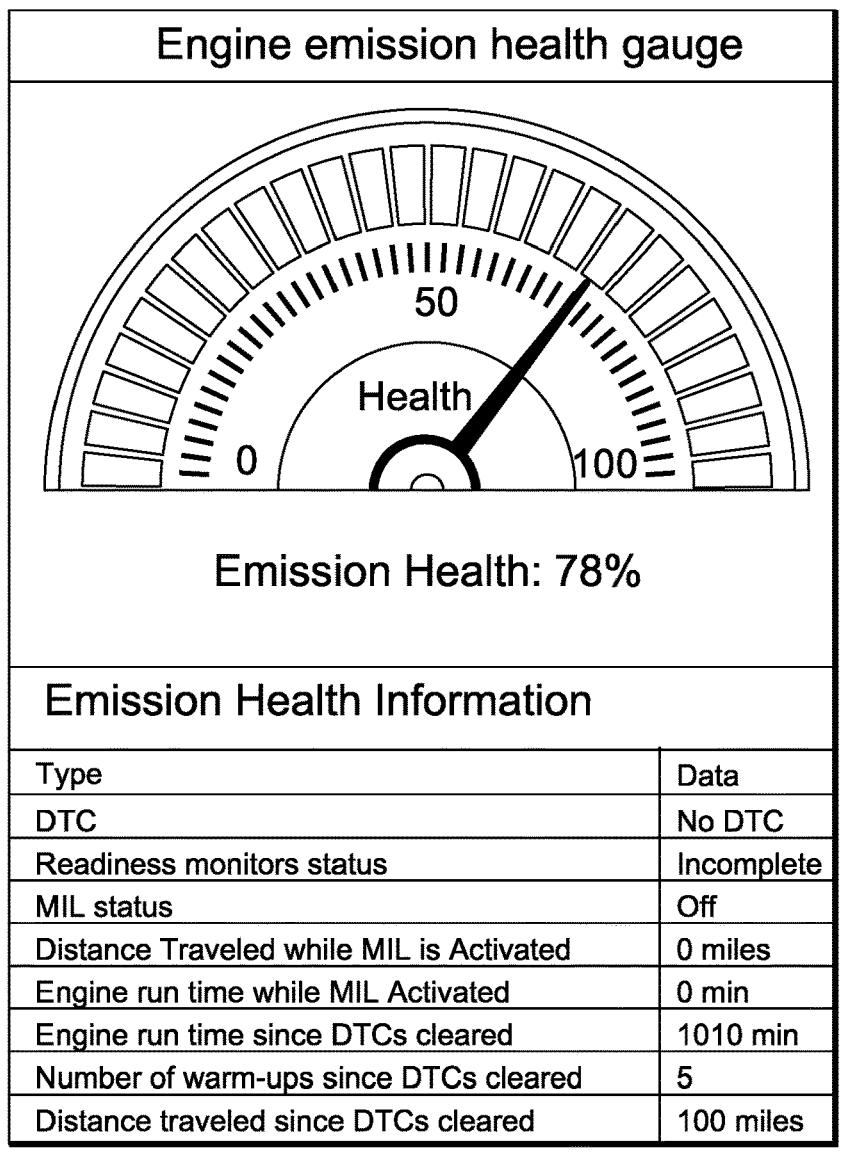

The vehicle health gauge system 22 may also be configured to calculate the percentage of engine emission health according to a predetermined number of factors which are inputs to a formula or algorithm. According to one embodiment, eight (8) factors are used in the calculation of the vehicle health gauge, including DTC, readiness monitor status, MIL status, distance traveled while MIL is activated, engine run time while MIL is activated, engine run time since DTCs cleared, number of warm-ups since DTCs cleared, and distance traveled since DTCs cleared. Each factor may be assigned a predetermined weight or percentage as an input into the algorithm. FIG. 4E may be an exemplary representation of a screenshot depicted on an electronic device of the diagnostic health gauge once the score has been determined. The health gauge may be depicted concurrently with the underlying health factor data that contributed to the score.

In one particular implementation, the factors are weighted according to the following table:

| Factor No. | Factor Name | Percentage (Gas) | Percentage (Diesel) |
|---|---|---|---|
| 1 | DTC | 10% | 10% |
| 2 | Readiness monitors status | 10% | 10% |
| 3 | MIL status | 35% | 35% |
| 4 | Distance Traveled While MIL is Activated | 15% | N/A |
| 5 | Engine run time while MIL activated | N/A | 7% |
| 6 | Engine run time since DTCs cleared | N/A | 8% |
| 7 | Number of warm-ups since DTCs cleared | 15% | 15% |
| 8 | Distance traveled since DTCs cleared | 15% | 15% |

Although the foregoing table provides one example of the percentages that may be assigned to each factor, it is contemplated that other percentages may be assigned to each factor without departing from the spirit and scope of the present disclosure.

The magnitude or weight prescribed to each factor may be associated with the values shown in the following table:

| Factor | Value | % | Note |
|---|---|---|---|
| DTC | Stored DTC | 0% | Any Store DTCs appear |
| DTC | Pending DTC | 50% | Any Pending DTCs appear |
| DTC | No DTC | 100% | |
| Readiness monitors status | Monitors Complete | 100% | Follow the FM program check |

-continued

| Factor | Value | % | Note |
|---|---|---|---|
| Readiness monitors status | Monitors Incomplete | 0% | Follow the FM program check |
| MIL status | MIL ON | 0% | |
| MIL status | MIL OFF | 100% | |
| Distance Traveled While MIL is Activated | 0 | 100% | =0 |
| Distance Traveled While MIL is Activated | 200 | 0% | >=200 |
| Distance Traveled While MIL is Activated | 0-200 | 0%-100% | >0; <200 |
| Engine run time while MIL activated | 0 | 100% | =0 |
| Engine run time while MIL activated | 1000 | 0% | >=1000 |
| Engine run time while MIL activated | 0-1000 | 0%-100% | >0; <1000 |
| Engine run time since DTCs cleared | 0 | 0% | =0 |
| Engine run time since DTCs cleared | 1000 | 100% | >=1000 |
| Engine run time since DTCs cleared | 0-1000 | 0%-100% | >0; <1000 |
| Number of warm-ups since DTCs cleared | 0 | 0% | =0 |
| Number of warm-ups since DTCs cleared | 15 | 100% | >=15 |
| Number of warm-ups since DTCs cleared | 0-15 | 0%-100% | >0; <15 |
| Distance traveled since DTCs cleared | 0 | 0% | =0 |
| Distance traveled since DTCs cleared | 200 | 100% | >=200 |
| Distance traveled since DTCs cleared | 0-200 | 0%-100% | >0; <200 |

After the vehicle health gauge system 22 calculates a vehicle health percentage based on the retrieved vehicle data, the result may be displayed for the user in the form of the gauge depicted in FIG. 1. Alternatively, the system 22 may display or otherwise indicate the vehicle health percentage, or other parameters, in the form of a displayed numerical value or other forms that indicate the amount or value of a parameter, such as a bar graph, a visual intensity level or a voice or other audible signal.

The following examples are provided to illustrate different diagnostic conditions on different vehicles which lead to various vehicle health grade scores. In these examples, California and Massachusetts are states that consider PDTC data when calculating vehicle health grade scores. Other states do not take PDTC data into consideration. It is noted that the inclusion of California and Massachusetts in these examples are for purposes of illustration only; the rules and regulations of any state may vary at any time, and thus, the scope of the present disclosure is not limited by any existing or future state or local regulation.

Example 1: The vehicle is 2004 Toyota Camry L4-2.4 L (2AZ-FE). The vehicle status retrieved from vehicle as below:

| Type | Data |
|---|---|
| Fuel Type | Gasoline |
| DTC | 0 |
| Readiness monitors status | Complete |
| MIL status | Off |
| Distance Traveled While MIL is Activated (PID $21) | 0 miles |
| Number of warm-ups since DTCs cleared (PID $30) | 15 |
| Distance traveled since DTCs cleared (PID $31) | 200 miles |

Vehicle health gauge calculates and have the result as below:

Case 01: Fuel Type is Gasoline and State is California and Massachusetts:

| Type | Data | Factor % | Contribute % |
|---|---|---|---|
| DTC after check PDTC regulation | No DTC | 100% | 10% |
| Readiness monitors status after checking acceptant | Complete | 100% | 10% |
| MIL status | Off | 100% | 35% |
| Distance Traveled While MIL is Activated (PID $21) | 0 miles | 100% | 15% |
| Number of warm-ups since DTCs cleared (PID $30) | 15 | 100% | 15% |
| Distance traveled since DTCs cleared (PID $31) | 200 miles | 100% | 15% |

Vehicle health gauge will show: 100%

Case 02: Fuel Type is Gasoline and State is others (e.g., not Cal. or Mass.):

| Type | Data | Factor % | Contribute % |
|---|---|---|---|
| DTC | No DTC | 100% | 10% |
| Readiness monitors status after checking acceptant | Complete | 100% | 10% |
| MIL status | Off | 100% | 35% |
| Distance Traveled While MIL is Activated (PID $21) | 0 miles | 100% | 15% |
| Number of warm-ups since DTCs cleared (PID $30) | 15 | 100% | 15% |
| Distance traveled since DTCs cleared (PID $31) | 200 miles | 100% | 15% |

Vehicle health gauge will show: 100%

Example 2: The vehicle is 2016 Toyota 4Runner V6-4.0 L (1GR-FE). The vehicle status retrieved from vehicle as below:

| Type | Data |
|---|---|
| Fuel Type | Gasoline |
| DTC | 1 PDTC |
| Readiness monitors status | Incomplete - Evaporative system monitoring |
| MIL status | Off |
| Distance Traveled While MIL is Activated (PID $21) | 0 miles |
| Number of warm-ups since DTCs cleared (PID $30) | 5 |
| Distance traveled since DTCs cleared (PID $31) | 200 miles |

Vehicle health gauge calculate and have the result as below:

Case 01: Fuel Type is Gasoline and State is California and Massachusetts:

| Type | Data | Factor % | Contribute % |
|---|---|---|---|
| DTC after check PDTC regulation | Not Meet PDTC | 0% | 0% |
| Readiness monitors status after checking acceptant | Complete (Meet acceptant) | 100% | 10% |

-continued

| Type | Data | Factor % | Contribute % |
|---|---|---|---|
| MIL status | Off | 100% | 35% |
| Distance Traveled While MIL is Activated (PID $21) | 0 miles | 100% | 15% |
| Number of warm-ups since DTCs cleared (PID $30) | 5 | 33% | 5% |
| Distance traveled since DTCs cleared (PID $31) | 200 miles | 100% | 15% |

Vehicle health gauge will show: 80%
Case 02: Fuel Type is Gasoline and State is Others:

| Type | Data | Factor % | Contribute % |
|---|---|---|---|
| DTC | No DTC (Ignore PDTC) | 100% | 10% |
| Readiness monitors status after checking acceptant | Complete (Meet acceptant) | 100% | 10% |
| MIL status | Off | 100% | 35% |
| Distance Traveled While MIL is Activated (PID $21) | 0 miles | 100% | 15% |
| Number of warm-ups since DTCs cleared (PID $30) | 5 | 33% | 5% |
| Distance traveled since DTCs cleared (PID $31) | 200 miles | 100% | 15% |

Vehicle health gauge will show: 90%

Example 3: The vehicle is 2015 Volkswagen Jetta L4, 2.0 L; 16V; Diesel; Turbo. The vehicle status retrieved from vehicle as below:

| Type | Data |
|---|---|
| Fuel Type | Diesel |
| DTC | 1 PDTC |
| Readiness monitors status | Incomplete - NMHC Catalyst; Boost Pressure; PM Filter |
| MIL status | Off |
| Distance Traveled While MIL is Activated (PID $21) | 0 miles |
| Engine run time while MIL activated (PID $4D) | 0 min |
| Engine run time since DTCs cleared (PID $4E) | 1010 min |
| Number of warm-ups since DTCs cleared (PID $30) | 5 |
| Distance traveled since DTCs cleared (PID $31) | 100 miles |

Vehicle health gauge calculate and have the result as below:
Case 01: Fuel Type is Diesel and State is California and Massachusetts:

| Type | Data | Factor % | Contribute % |
|---|---|---|---|
| DTC after check PDTC regulation | Not Meet PDTC | 0% | 0% |
| Readiness monitors status after checking acceptant | Incomplete (Not meet acceptant) | 0% | 0% |
| MIL status | Off | 100% | 35% |
| Distance Traveled While MIL is Activated (PID $21) | 0 miles | N/A | N/A |
| Engine run time while MIL activated (PID $4D) | 0 min | 100% | 7% |
| Engine run time since DTCs cleared (PID $4E) | 1010 min | 100% | 8% |
| Number of warm-ups since DTCs cleared (PID $30) | 5 | 33% | 5% |
| Distance traveled since DTCs cleared (PID $31) | 100 miles | 50% | 15% |

Vehicle health gauge will show: 70%
Case 02: Fuel Type is Diesel and State is Others:

| Type | Data | Factor % | Contribute % |
|---|---|---|---|
| DTC after check PDTC regulation | NoDTC (Ignore PDTC) | 100% | 10% |
| Readiness monitors status after checking acceptant | Incomplete (Not meet acceptant) | 0% | 0% |
| MIL status | Off | 100% | 35% |
| Distance Traveled While MIL is Activated (PID $21) | 0 miles | N/A | N/A |
| Engine run time while MIL activated (PID $4D) | 0 min | 100% | 7% |
| Engine run time since DTCs cleared (PID $4E) | 1010 min | 100% | 8% |
| Number of warm-ups since DTCs cleared (PID $30) | 5 | 33% | 5% |
| Distance traveled since DTCs cleared (PID $31) | 100 miles | 50% | 15% |

Vehicle health gauge will show: 80%

Once the vehicle health score is determined, the score or the underlying data, may be used to provide additional information to the user. For instance, in one implementation, the underlying data may be used to provide information to the user with regard to how to improve the vehicle health score. The system 22 may be able to identify the factor(s) that are weighing most heavily on the score, as well as what may be done to improve the identified factor(s). For example, if the number of warm-ups since DTCs cleared factor is weighing against the vehicle health score, the system 22 may identify that factor and provide an indication to the user that the health score may be improved by increasing the number of warm-ups since the DTCs have cleared.

In some instances, improving the health score may not be as clear. For instance, if the factor regarding readiness monitor status is incomplete, additional diagnostics may be required to determine the particular readiness monitor(s) that are incomplete, and what steps may be needed to complete them. Similarly, if the presence of DTCs is weighing against the vehicle health score, the system may be able to automatically translate the DTC to the user and identify a possible fix for clearing the DTC, e.g., repairing/replacing a repair part. The system 22 may be capable of linking the user with a repair shop 34 or parts store 36 to facilitate the procurement of the needed parts/services to improve the vehicle health score. The linking between the user's smartphone and the repair shop 34/parts store 36 may be done autonomously in response to the system 22 identifying a particular repair or part needing replacement to increase the score. The system 22 may identify the repair shop 34 or parts store 36 based on geographic proximity to the user, user preference (e.g., preference for a particular brand/company), or affiliation with the operator of the system 22. For more information related to the analysis of diagnostic data, please refer to the following U.S patents, owned by Innova Electronic Corporation, which is also the owner of the present disclosure: U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FLED SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 10,643,403, entitled PREDICTIVE DIAGNOSTIC METHOD AND SYSTEM, U.S. Patent Application Pub. No. 2013/0297143, entitled METHOD OF PROCESSING VEHICLE DIAGNOSTIC DATA, U.S. Patent Application Pub. No. 2019/0304208, entitled SYSTEM AND METHOD FOR PROACTIVE VEHICLE DIAGNOSIS AND OPERATIONAL ALERT, and U.S. Patent Application Pub. No. 2019/0304213, entitled SYSTEM AND METHOD FOR PROACTIVE VEHICLE DIAGNOSIS AND OPERATIONAL ALERT, the entire contents of each of which is expressly incorporated herein by reference.

Despite the complexity associated with any given factor, the vehicle health gauge system 22 may be configured to provide an option to the user for identifying which factors are weighing against the overall vehicle health score, and what steps may be taken with regard to each factor for improving the score for that factor. In this regard, some user's may not be concerned with more detailed information, and instead, may be content with receiving the vehicle health score, while other user's may be more interested in obtaining the more detailed information. As such, the system 22 may be capable of generating a prompt either concurrently while displaying the vehicle health gauge 10 or subsequent to displaying the vehicle health gauge 10, with the prompt asking the user if there is interest in seeing the factor(s) which are weighing against the vehicle health score. If the user is interested, the factor(s) may be displayed, and then a second prompt may be displayed asking the user if there is interest in identifying what can be done for improving the identified factor(s).

Although the foregoing describes a method wherein the user is prompted before displaying information regarding the negative factor(s) and steps that may be taken to improve those factors, in another embodiment the system may be configured to autonomously display that information, either concurrently with the vehicle health gauge 10 if the display field includes enough space, or in a scrolling fashion, which may be more suitable for a smaller display screen.

The system 22 may also be capable of comparing the vehicle health score of a particular vehicle with a standardized vehicle health score of similar vehicles. The standardized health score may be calculated based on a compilation of previous health scores in those similar vehicles. What is deemed a "similar vehicle" for purposes of determining the standardized health score may be varied from being broad to narrow. For instance, in a broad scenario, the standardized vehicle health score may be based on all vehicles from a particular manufacturer (e.g., Toyota™), or all vehicles from a particular year (e.g., all 2013 model year vehicles). In a narrow scenario, the standardized vehicle health score may be based on more particular standardization factors. For instance, the standardized score may be based on vehicles having the same year, make, model and engine of the vehicle under test. The narrow standardization may provide useful to identify possible strengths and weakness of vehicles that are the same or identical to the vehicle under test. The broad standardization may be useful to try and identify possible strengths and weaknesses associated with a particular manufacturer, or to try and identify strengths and weaknesses associated with a particular year, such as after a new regulation or standard was implemented.

In order to complete the standardized score, a user would identify the particular standardization group (e.g., vehicles from same year, or vehicles with same year, make model engine, etc.). Once the standardization group has been identified, a historical database having historical vehicle health scores matched with vehicle identification information, would be accessed. The historical vehicle health scores associated with the vehicle identification information associated with the standardization group would be identified and averaged to determine the standardized vehicle health score.

After the user calculates the vehicle health score of the vehicle under test, the calculated vehicle health score may be compared to the standardized vehicle health score to identify whether the health of the particular vehicle is better or worse than the vehicles associated with the standardized score. In the event the comparison shows the user's vehicle health score is higher than the standardized score, the user may be provided with a sense of relief that his vehicle is better than the average or standard vehicle in the same class. Conversely, if the comparison shows the user's vehicle health score is lower than the standardized score, the user may be motivated to make repairs or fixes to the vehicle to improve the vehicle health score to at least meet the standardized score.

The comparison between the user's vehicle health score and the standardized score may be useful in connection with the sale of used vehicles. For instance, if a particular vehicle is associated with a high vehicle health score, particularly relative to its class, that may be a key selling point that may be listed in connection with the sale of the vehicle.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of determining a vehicle health score for a vehicle for providing a vehicle-specific and location-specific assessment of vehicle health, the method comprising:
   receiving location information associated with a location of the vehicle;
   identifying at least one location-specific health factor based on the received location information;
   receiving vehicle identification information for the vehicle;
   configuring a multi-factor vehicle health test to include prescribed health factors including Permanent Diagnostic Trouble Code (PDTC) and associated conditions based on the received vehicle identification information and location information;

receiving diagnostic data in a format transmissible via a diagnostic port on the vehicle, the diagnostic data including data points associated with several different heath factors including the prescribed health factors;

running the configured multi-factor vehicle health test by comparing the received diagnostic data with the associated conditions for each health factor and assigning a preliminary score for each health factor based on the comparison;

assigning a weight to each of the preliminary scores;

calculating a comprehensive vehicle health score based on each of the weighted preliminary scores;

displaying the comprehensive vehicle health score on a display;

evaluating the diagnostic data subsequent to an earlier diagnostic event to determine whether the PDTC is triggered; and when a PDTC is triggered, displaying a trend in overall vehicle health on the display.

2. The method recited in claim 1, further comprising the step of identifying at least one of the health factors impacting the comprehensive vehicle health score negatively.

3. The method recited in claim 2, further comprising the step of identifying a replacement part associated with the at least one of the health factors impacting the comprehensive vehicle health score negatively.

4. The method recited in claim 2, further comprising the step of identifying a repair procedure associated with the at least one of the health factors impacting the comprehensive vehicle health score negatively.

5. The method recited in claim 1, wherein the location-specific health factor relates to a local smog regulation.

6. The method recited in claim 1, wherein the location information is received from a Global Positioning System (GPS) circuit located in a handheld electronic device.

7. The method recited in claim 1, wherein the diagnostic data includes Diagnostic Trouble Code (DTC) data, readiness monitor status data, and Malfunction Indicator Lamp (MIL) status data.

8. The method recited in claim 7, wherein the DTC data includes information regarding whether a DTC has been stored, is pending, or is absent.

9. The method recited in claim 7, wherein the DTC data includes information regarding engine run time since DTC has cleared, a number of warm-ups since DTC has cleared, and distance traveled since DTC has cleared.

10. The method recited in claim 7, wherein the MIL status data includes MIL status, distance traveled while MIL is activated, and engine run time while MIL is activated.

11. The method recited in claim 1, wherein the step of receiving the diagnostic data includes receiving diagnostic data via a wired connection with the diagnostic port.

12. The method recited in claim 1, wherein the step of receiving diagnostic data includes wirelessly receiving the diagnostic data from the diagnostic port.

13. A system for determining a vehicle health score for a vehicle for providing a vehicle-specific and location-specific assessment of vehicle health, the system comprising:

a data acquisition tool operatively connectable to a vehicle for retrieving diagnostic data and vehicle identification information in a format transmissible via a diagnostic port on the vehicle;

a memory circuit having acceptable conditions associated with a plurality of vehicle health factors stored thereon and weights assigned to each of the vehicle health factors, at least one of the plurality of vehicle health factors being a location specific health factor; and a scoring circuit in communication with the memory circuit and the data acquisition tool and disposable in communication with a GPS circuit to receive location information therefrom, the scoring circuit being adapted to:

configure a multi-factor vehicle health test to include prescribed health factors including Permanent Diagnostic Trouble Code (PDTC) and associated conditions based on the received vehicle identification information and location information;

run the configured multi-factor vehicle health test by comparing the received diagnostic data with the associated conditions for each health factor, assign a preliminary score for each health factor based on the comparison, evaluate the diagnostic data subsequent to an earlier diagnostic event to determine whether the PDTC is triggered; and when the PDTC is triggered, display a trend in overall vehicle health on the display.

14. The system recited in claim 13, further comprising a diagnostic computing device separate from the data acquisition tool, the memory circuit being located in the diagnostic computing device.

15. The system recited in claim 14, wherein the scoring circuit is located in the diagnostic computing device.

16. The system recited in claim 15, wherein the diagnostic computing device is a diagnostic server.

17. The system recited in claim 14, wherein the scoring circuit is located outside of the diagnostic computing device.

18. The system recited in claim 13, wherein the scoring circuit is configured to identify at least one of the health factors impacting the comprehensive vehicle health score negatively.

19. The system recited in claim 18, wherein the scoring circuit is configured to identify a replacement part associated with the at least one of the health factors impacting the comprehensive vehicle health score negatively.

20. The system recited in claim 18, wherein the scoring circuit is configured to identify a repair procedure associated with the at least one of the health factors impacting the comprehensive vehicle health score negatively.

21. A non-transitory computer readable medium storing computer executable instructions for use in determining a vehicle-specific and location-specific vehicle health score for a vehicle, the computer executable instructions being downloadable onto a mobile communication device for configuring a processor of the mobile communication device to:

determine location information associated with a location of the vehicle;

identify at least one location-specific health factor and conditions thereof based on the determined location information;

receive vehicle identification information for the vehicle;

configure a multi-factor vehicle health test to include prescribed health factors including Permanent Diagnostic Trouble Code (PDTC) and associated conditions based on the received vehicle identification information and location information;

receive diagnostic data in a format transmissible via a diagnostic port on the vehicle, the diagnostic data including data points associated with several different heath factors including the at least one location-specific health factor, each health factor being associated with an associated condition;

run the configured multi-factor vehicle health test by comparing the received diagnostic data with the associated conditions for each health factor and assigning a preliminary score for each health factor based on the comparison;
assign a weight to each of the preliminary scores;
calculate a comprehensive vehicle health score based on each of the weighted preliminary scores;
display the comprehensive vehicle health score on a display;
evaluate the diagnostic data subsequent to an earlier diagnostic event to determine whether the PDTC is triggered; and
when the PDTC is triggered, display a trend in overall vehicle health on the display.

22. The non-transitory computer readable medium recited in claim 21, wherein the processor further configures the mobile communication device to identify at least one of the health factors impacting the comprehensive vehicle health score negatively.

* * * * *